US011889472B2

(12) United States Patent
Oroskar et al.

(10) Patent No.: US 11,889,472 B2
(45) Date of Patent: Jan. 30, 2024

(54) WIRELESS COMMUNICATION SYSTEM TO DELIVER PAGES TO WIRELESS COMMUNICATION DEVICES BASED ON WIRELESS FIDELITY NETWORK IDENTIFIERS

(71) Applicant: T-Mobile Innovations LLC, Overland Park, KS (US)

(72) Inventors: Siddharth Oroskar, Overland Park, KS (US); Jasinder Pal Singh, Olathe, KS (US); Maulik K. Shah, Austin, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 132 days.

(21) Appl. No.: 17/469,394

(22) Filed: Sep. 8, 2021

(65) Prior Publication Data

US 2021/0410110 A1  Dec. 30, 2021

Related U.S. Application Data

(63) Continuation of application No. 14/326,137, filed on Jul. 8, 2014, now Pat. No. 11,147,042.

(51) Int. Cl.
*H04W 68/12* (2009.01)
*H04W 12/06* (2021.01)

(52) U.S. Cl.
CPC .......... *H04W 68/12* (2013.01); *H04W 12/06* (2013.01)

(58) Field of Classification Search
CPC .............................. H04W 12/06; H04W 68/12
See application file for complete search history.

(56) References Cited

U.S. PATENT DOCUMENTS

| 7,474,897 B2 | 1/2009 | Morgan et al. |
| 8,565,793 B1* | 10/2013 | Koodli ................. H04W 68/04 455/458 |
| 2005/0037781 A1* | 2/2005 | Ozugur ............ H04W 52/0216 455/458 |
| 2007/0238466 A1 | 10/2007 | Buckley et al. |
| 2008/0259912 A1 | 10/2008 | Wang et al. |
| 2008/0305792 A1 | 12/2008 | Khetawat et al. |
| 2011/0216743 A1 | 9/2011 | Bachmann et al. |
| 2011/0261787 A1 | 10/2011 | Bachmann et al. |

(Continued)

OTHER PUBLICATIONS

Jaewon Lim; "Cellular Paging Through WLAN"; U.S. Appl. No. 61/577,016, filed Dec. 17, 2011; 14 pages.

*Primary Examiner* — Brian P Cox

(57) ABSTRACT

A wireless communication network pages a wireless communication device over Orthogonal Frequency Division Multiplexing (OFDM) access points. To send the page, a WIFI gateway identifies WIFI networks that serve the wireless user device. The WIFI gateway determines individual ones of the Orthogonal Frequency Division Multiplexing (OFDM) access points to page the wireless user device based on the individual ones of the WIFI networks that serve the wireless user device. The WIFI gateway indicates the OFDM access points to a paging system. The paging system receives a page for the wireless user device and responsively transfers the page to a current one of the OFDM access points indicated by the WIFI gateway. The current one of the OFDM access points receives the page and wirelessly transfers the page to the wireless user device.

20 Claims, 6 Drawing Sheets

(56) References Cited

U.S. PATENT DOCUMENTS

| | | |
|---|---|---|
| 2011/0263274 A1 | 10/2011 | Fox et al. |
| 2013/0288668 A1 | 10/2013 | Pragada et al. |
| 2014/0036873 A1 | 2/2014 | Cheng et al. |
| 2014/0293970 A1* | 10/2014 | Damnjanovic ....... H04L 5/0078 370/336 |
| 2015/0117231 A1 | 4/2015 | Yang et al. |
| 2015/0382393 A1 | 12/2015 | Kiss |
| 2016/0029282 A1 | 1/2016 | Lee et al. |
| 2017/0086162 A1 | 3/2017 | Osterlund et al. |

* cited by examiner

WIRELESS COMMUNICATION SYSTEM TO DELIVER PAGES TO WIRELESS COMMUNICATION DEVICES BASED ON WIRELESS FIDELITY NETWORK IDENTIFIERS

RELATED CASES

This United States patent application is a continuation of U.S. patent application Ser. No. 14/326,137 that was filed on Jul. 8, 2014 and is entitled "A WIRELESS COMMUNICATION SYSTEM TO DELIVER PAGES TO WIRELESS COMMUNICATION DEVICES BASED ON WIRELESS FIDELITY NETWORK IDENTIFIERS." U.S. patent application Ser. No. 14/326,137 is hereby incorporated by reference into this United States patent application.

TECHNICAL BACKGROUND

A cellular communication network typically transfers information to the wireless communication devices to indicate incoming voice calls or text messages, network alerts, or other alerts and messages. This information, often referred to as pages, is routed through the cellular access points to the wireless communication devices via a paging channel. When a wireless communication device connects through a non-cellular wireless communication network, such as a WIFI network, it still monitors the paging channel on the cellular network for pages.

Wireless communication devices communicate with cellular communication networks using wireless protocols, such as Long Term Evolution (LTE), Evolution Data Optimized (EVDO), Code Division Multiple Access (CDMA), Global System for Mobile communications (GSM), High Speed Packet Access (HSPA), and the like. Some wireless communication devices may also communicate over local wireless communication networks such as Wireless Fidelity (WIFI) networks. Wireless communication devices may access WIFI networks through a WIFI gateway system. Wireless communication devices, such as cellular phones are mobile and may be moved throughout a geographic area. As wireless communication devices change location, they may connect to various communication networks via different access points.

Generally, pages for a wireless communication device will be sent to the last known cellular access point that the wireless communication device connected through. However, if the wireless communication device travels out of the coverage area of the cellular access point while idle on the cellular network its location may not be updated in the cellular network. Therefore, the last known cellular access point the wireless communication device connected through may not be accurate. If the page is sent to the last known cellular access point for the wireless communication device, the wireless communication device may not receive the page(s). When the page(s) is not received, it will be sent to surrounding cellular access points, increasing in coverage area, until the wireless communication device is located or all cellular access points are broadcasting the page(s). WIFI networks may correspond to cellular access point based on geographic location.

Overview

A wireless communication network pages a wireless communication device over Orthogonal Frequency Division Multiplexing (OFDM) access points. To send the page, a WIFI gateway identifies WIFI networks that serve the wireless user device. The WIFI gateway determines individual ones of the Orthogonal Frequency Division Multiplexing (OFDM) access points to page the wireless user device based on the individual ones of the WIFI networks that serve the wireless user device. The WIFI gateway indicates the OFDM access points to a paging system. The paging system receives a page for the wireless user device and responsively transfers the page to a current one of the OFDM access points indicated by the WIFI gateway. The current one of the OFDM access points receives the page and wirelessly transfers the page to the wireless user device.

DETAILED DESCRIPTION

Figure 1:
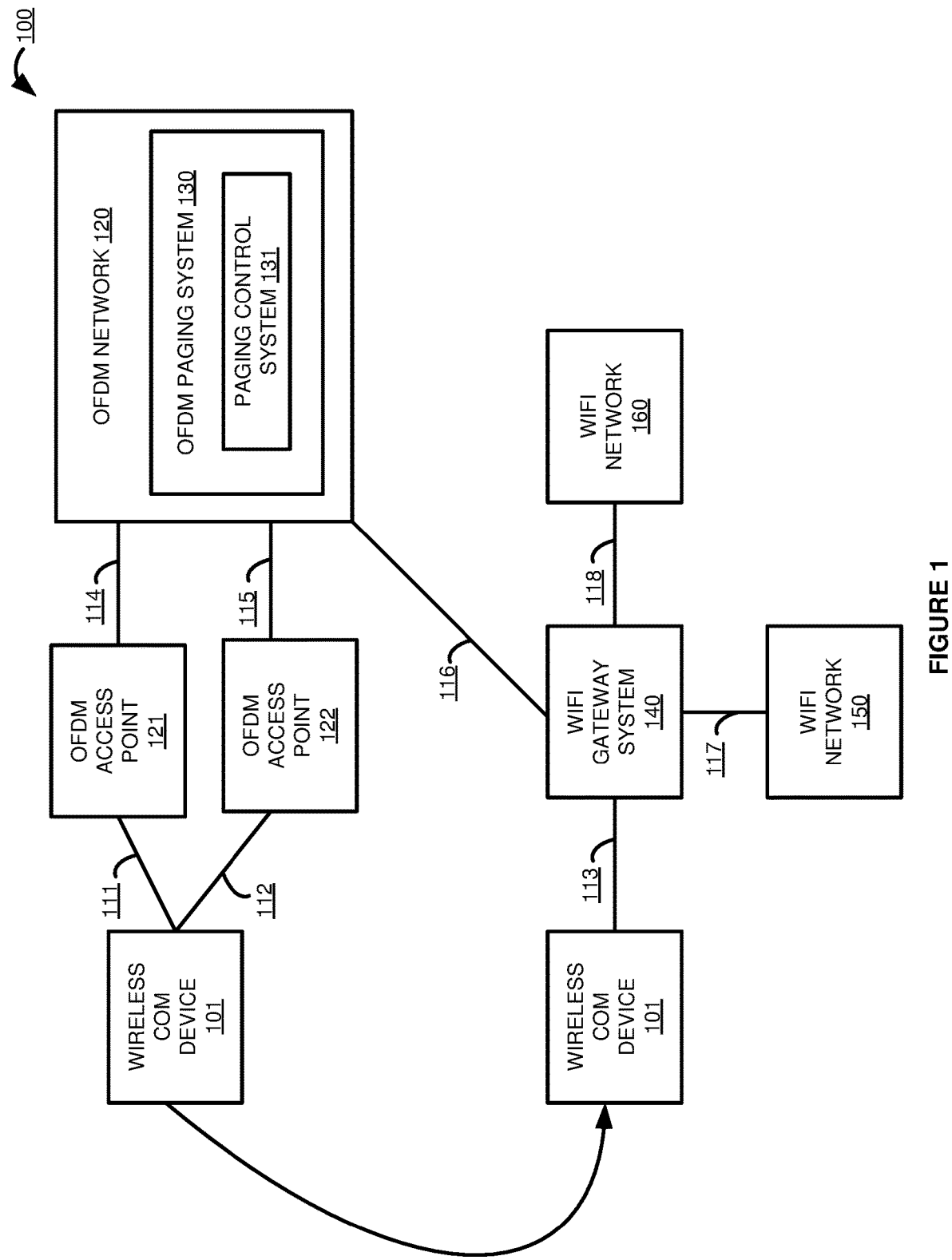
FIG. 1 illustrates a wireless communication system to deliver pages to wireless communication devices based on a WIFI network identifier.

FIG. 1 illustrates wireless communication system 100 to deliver pages to wireless communication device 101 based on a WIFI network identifier. Wireless communication system 100 includes wireless communication device 101, OFDM network 120, OFDM access points 121-122, WIFI gateway system 140, WIFI networks 150 and 160, wireless communication links 111-113, and communication links 114-118. OFDM network 120 includes OFDM paging system 130 that includes paging control system 131.

Examples of wireless communication device 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof. In some examples, OFDM network 120 comprises an LTE communication network. Examples of OFDM access points 121-122 include base stations, base station transceivers (BTS), eNodeB, femtocell, picocells, or other access points—including combinations thereof. In some examples, WIFI gateway system 140 comprises an evolved Packet Data Gateway (ePDG).

Wireless communication device 101 and OFDM access point 121 communicate over wireless communication link 111. Wireless communication device 101 and OFDM access point 122 communicate over wireless communication link 112. OFDM access points 121 and 122 may be geographically located near each other, with overlapping coverage areas, or may not be near each other. Wireless communication device 101 and WIFI gateway system 140 communicate over wireless communication link 113. OFDM access points 121-122 communicate with OFDM network 120 over communication links 114-115, respectively. WIFI gateway system 140 communicates with OFDM network 120 over communication link 116. WIFI gateway system 140 communicates with WIFI network 150 over communication link 117. WIFI gateway system 140 communicates with WIFI network 160 over communication link 118.

In operation, OFDM access points 121-122 exchange wireless communications to serve wireless communication device 101. For example, wireless communications may include text messages, voice calls, video calls, multimedia requests, data requests, or other wireless communications—including combinations thereof. OFDM access points 121-122 transfer corresponding service messages for delivery to paging control system 131. Paging control system 131 processes the service messages to identify the current OFDM access point serving the wireless communication device. WIFI gateway system 140 receives a series of authorization requests for wireless communication device 101 to access WIFI communication networks 150 and/or 160. WIFI gateway system 140 transfers WIFI access authorizations for delivery to WIFI communication networks 150 and 160.

The authorization requests indicate the WIFI network identifier. For example, the WIFI network identifier could be a WIFI Service Set Identification (SSID), Media Access Control (MAC) address, an IP address, Uniform Resource Identifier (URI), or some other identifier—including combinations thereof. Wireless communication device 101 is idle on OFDM access points 121-122 when on WIFI communication networks 150 and/or 160. In some examples, wireless communication device 101 may be active on WIFI network 150, but still monitoring the paging channel on OFDM access point 121 or 122.

In response to receiving the authorization requests, WIFI gateway system 140 translates the WIFI network identifiers into corresponding OFDM access point identifiers. The OFDM access point identifiers may comprise base station identifiers, eNodeB identifiers, or some other identifiers—including combinations thereof. WIFI gateway system 140 transfers the corresponding OFDM access point identifiers to the paging control system 131. Paging control system 131 processes the corresponding OFDM access point identifiers to identify the current OFDM access point serving wireless communication device 101 when the wireless communication device is idle on OFDM network 120.

Figure 2:
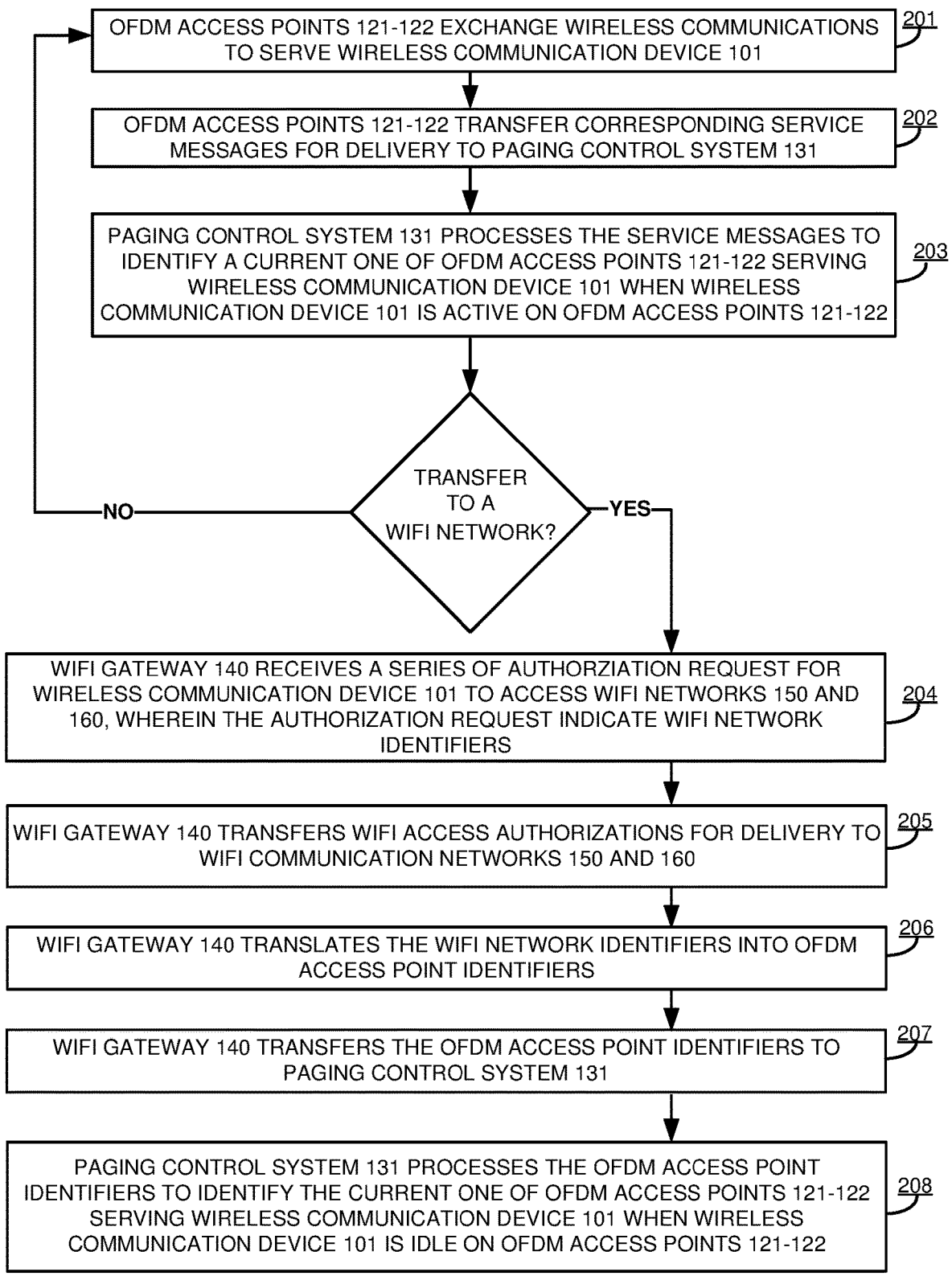
FIG. 2 illustrates the operation of the wireless communication system to deliver pages to wireless communication devices based on a WIFI network identifier.

FIG. 2 illustrates the operation of wireless communication system 100 to deliver pages to wireless communication device 101 based on a WIFI network identifier. OFDM access points 121-122 exchange wireless communications to serve wireless communication device 101 (201). OFDM access points 121-122 transfer corresponding service messages for delivery to paging control system 131 (202). Paging control system 131 processes the service messages to identify the current OFDM access point serving the wireless communication device when wireless communication device 101 is active on OFDM access points 121-122 (203). Wireless communication device 101 transfers to a WIFI network.

WIFI gateway system 140 receives a series of authorization requests for wireless communication device 101 to access WIFI communication networks 150 and/or 160 (204). The authorization requests indicate the WIFI network identifier. Wireless communication device 101 is idle on OFDM access points 121-122 when on WIFI communication networks 150 and 160. WIFI gateway system 140 transfers WIFI access authorizations to WIFI communication networks 150 and 160 (205). In response to receiving the authorization requests, WIFI gateway system 140 translates the WIFI network identifiers into corresponding OFDM access point identifiers (206). For example, there may be a lookup table or some other data structure that correlates WIFI network identifiers with OFDM access point identifiers based on geographic location. In other examples, wireless communication device 101 may be queried for the OFDM access point identifier. In yet another example, the OFDM network or access point may be queried for the identifier. WIFI gateway system 140 transfers the corresponding OFDM access point identifiers to the paging control system 131 (207). Paging control system 131 processes the corresponding OFDM access point identifiers to identify the current OFDM access point serving wireless communication device 101 when the wireless communication device is idle on OFDM network 120 (208).

Figure 3:
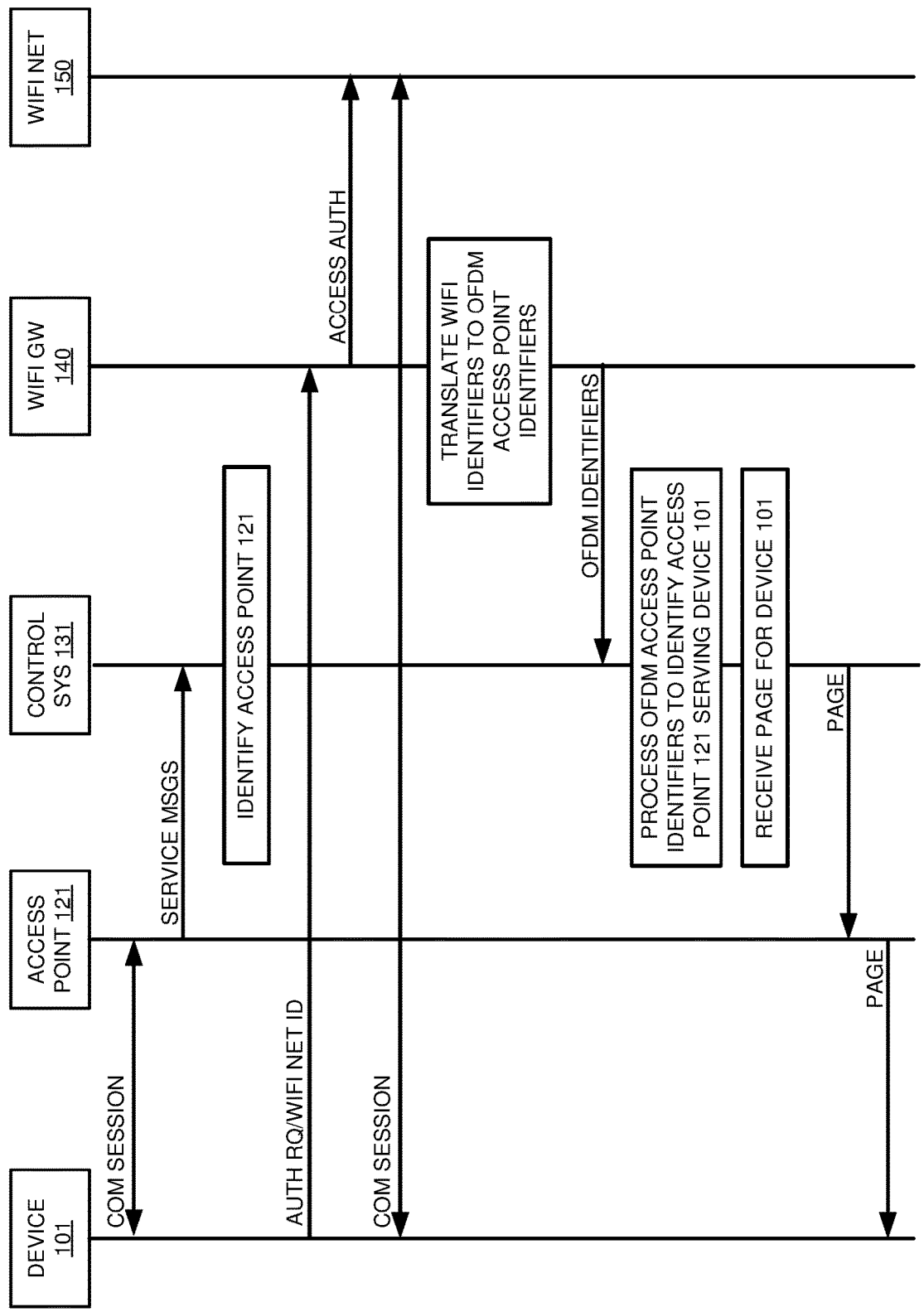
FIG. 3 illustrates operation of the wireless communication system to deliver pages to wireless communication devices based on a WIFI network identifier.

FIG. 3 illustrates the operation of wireless communication system 100 to deliver pages to wireless communication device 101 based on a WIFI network identifier. Wireless communication device 101 exchanges wireless communications with OFDM access point 121 for a communication session. OFDM access point 121 transfers the corresponding service messages for delivery to paging control system 131. Paging control system 131 processes the services messages to identify OFDM access point 121 as currently serving wireless communication device 101.

In some examples, wireless communication device 101 may also exchange wireless communications with OFDM access point 122. For instance, the communication session may be handed off to OFDM access point 122. Wireless communication device 101 exchanges wireless communications with OFDM access point 122 for the communication session. OFDM access point 122 transfers the corresponding service messages for delivery to paging control system 131. Paging control system 131 processes the services messages to identify OFDM access point 121 as currently serving wireless communication device 101.

WIFI gateway system 140 receives a series of authorization requests for wireless communication device 101 to access WIFI communication network 150. WIFI gateway system 140 transfers WIFI access authorizations for delivery to WIFI communication network 150. The authorization requests indicate the WIFI network identifier for wireless communication network 150. Wireless communication device 101 is idle on OFDM access points 121-122 when on WIFI communication network 150.

In response to receiving the authorization requests, WIFI gateway system 140 translates the WIFI network identifier for WIFI network 150 into corresponding OFDM access point identifiers. WIFI gateway system 140 transfers the corresponding OFDM access point identifiers to the paging control system 131. Paging control system 131 processes the corresponding OFDM access point identifiers to identify OFDM access point 121 serving wireless communication device 101 when the wireless communication device is idle on OFDM network 120. Paging control system 131 transfers a page to wireless communication device 101 via the paging channel on OFDM access point 121.

For example, wireless communication device 101 is accessing OFDM network 120 via OFDM access point 121. Then the user of wireless communication device 101 enters a coffee shop and accesses WIFI network 150 through a WIFI hotspot, when the user leaves the coffee shop and is out of the coverage area of WIFI network 150, wireless communication device 101 may reconnect to OFDM network 120 through OFDM access point 121.

In other examples, wireless communication device 101 is accessing OFDM network 120 via OFDM access point 121.

Wireless communication device then accesses WIFI network 150 through a WIFI access point. While wireless communication device 101 is connected to WIFI network 150, the device travels out of the coverage area of OFDM access point 121. For instance, the user of wireless communication device 101 may be traveling on a train and when the user exits the train, the user is no longer in the coverage are of OFDM access point 121. Once wireless communication device 101 is out the coverage area of WIFI network 150, wireless communication device 101 connects to OFDM network 120 through OFDM access point 122. Although not required, wireless communication device 101 may access multiple WIFI networks before transferring back to a cellular network.

Figure 4:
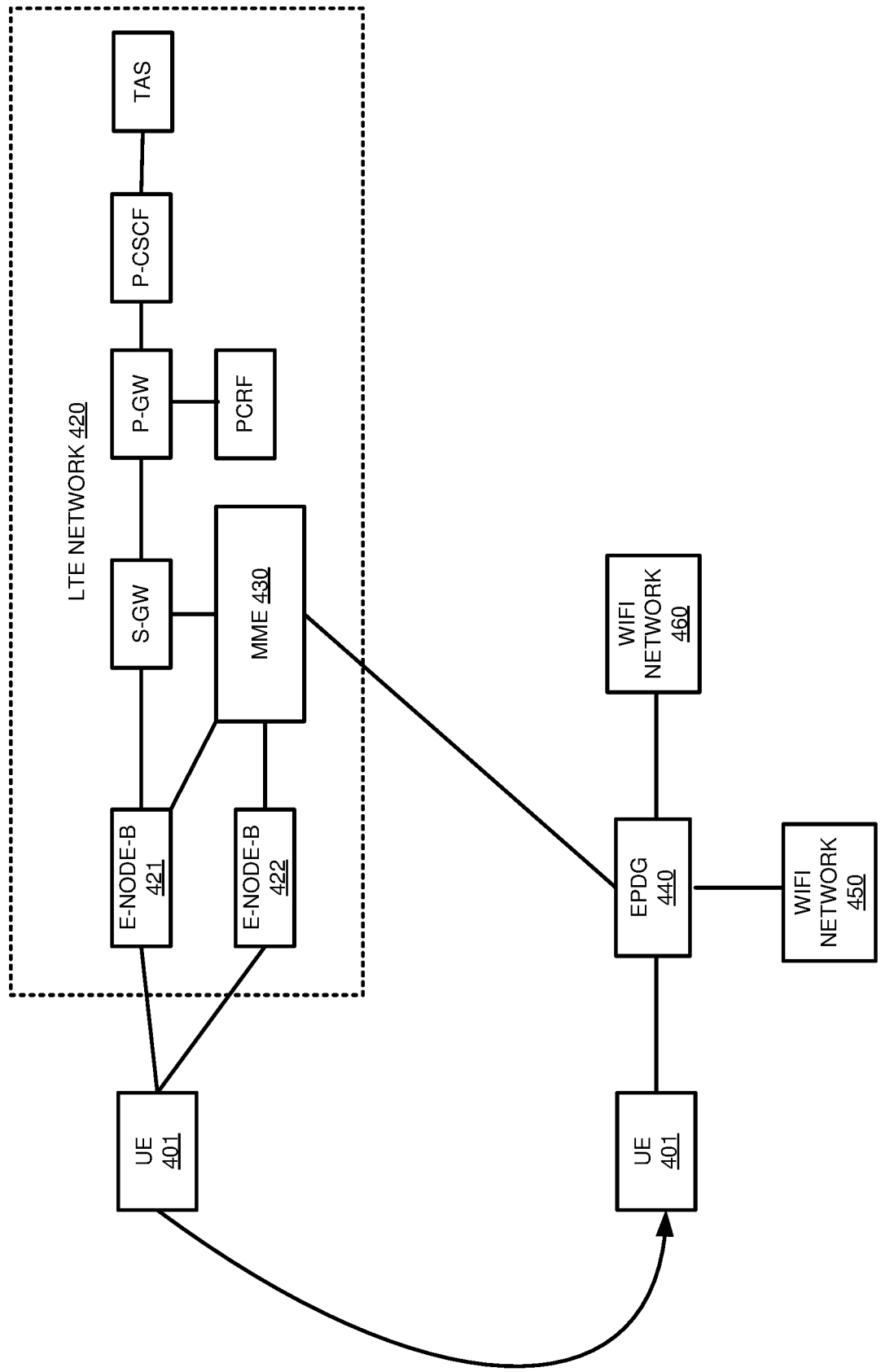
FIG. 4 illustrates a wireless communication system to deliver pages to wireless communication devices based on a WIFI network identifier.

FIG. 4 illustrates wireless communication system 400 to deliver pages to user equipment based on a WIFI network identifier. Wireless communication system 400 is an example of wireless communication system 100, although wireless communication system 100 may use alternative configurations and operations. Wireless communication system 400 includes User Equipment (UE) 401, LTE network 420, evolved Packet Data Gateway (ePDG) 440, and WIFI networks 450 and 460. LTE network 420 includes the eNodeBs 421-422, Mobility Management Entity (MME) 430, Serving Gateway (S-GW), PDN Gateway (P-GW), Policy and Charging Rules Function (PCRF), Proxy Call Session Control Function (P-CSCF), and Telephony Application Server (TAS). LTE network 421 may also include other components not shown here for clarity.

Figure 5:
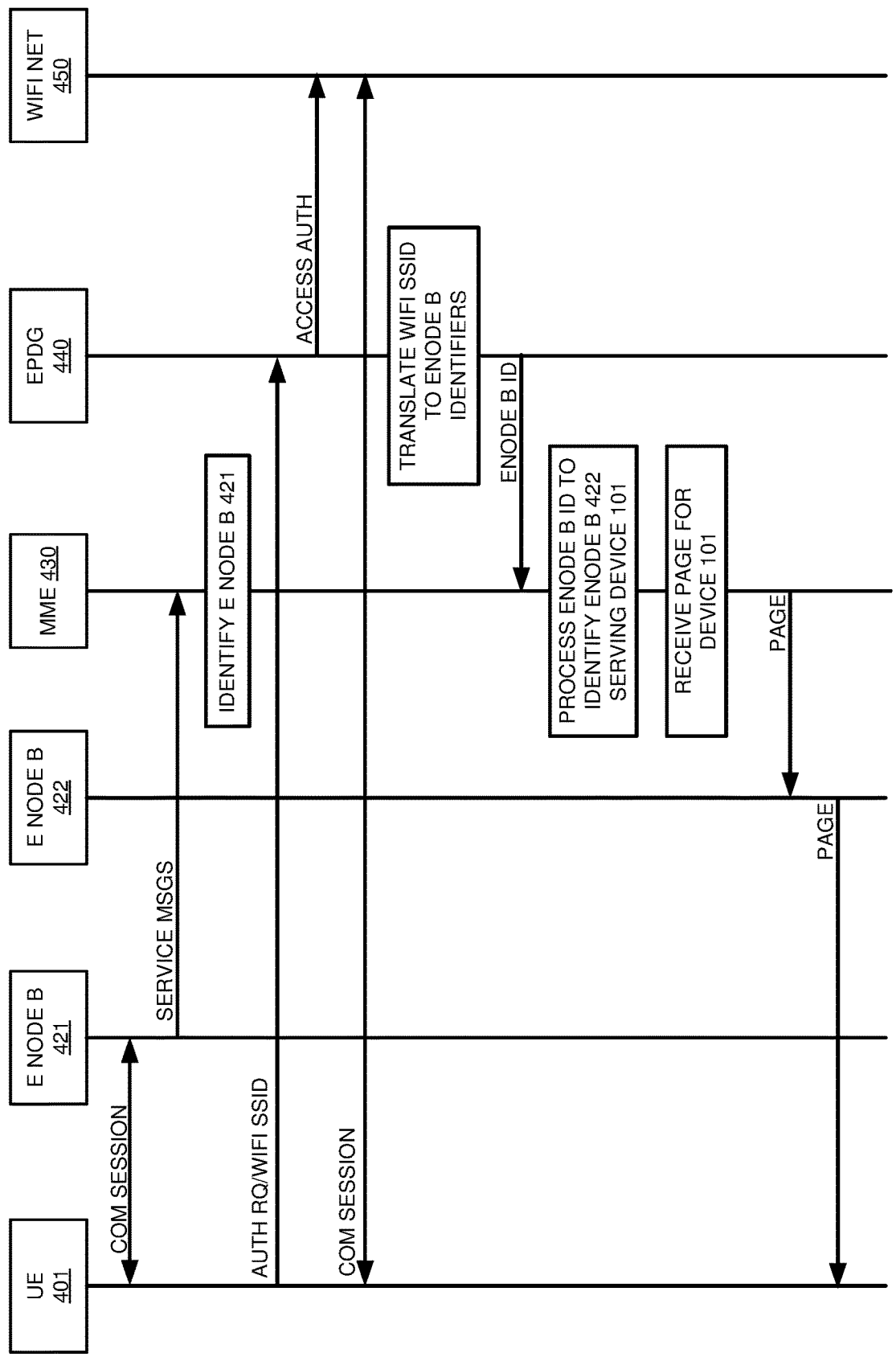
FIG. 5 illustrates the operation of the wireless communication system to deliver pages to wireless communication devices based on a WIFI network identifier.

FIG. 5 illustrates the operation of wireless communication system 400 to deliver pages to UE 401 based on a WIFI network identifier. UE 401 exchanges wireless communications with eNodeB 421 for a communication session. ENodeB 421 transfers the corresponding service messages for delivery to MME 430. MME 430 processes the services messages to identify eNodeB 421 as currently serving UE 401.

EPDG 440 receives a series of authorization requests for UE 401 to access WIFI communication network 450. The authorization requests indicate the WIFI SSIDs for WIFI communication network 450. EPDG 440 transfers WIFI access authorizations for delivery to WIFI communication network 450. UE 401 is idle on eNodeBs 421-422 when on WIFI communication network 450.

In response to receiving the authorization requests, ePDG 440 translates the WIFI network identifier for WIFI network 450 into corresponding eNodeB identifiers. EPDG 440 transfers the corresponding eNodeB identifiers to the MME 430. MME 430 processes the corresponding eNodeB identifiers to identify the current eNodeB serving UE 401 when UE 401 is idle on LTE network 420. UE 401 leaves the coverage area of eNodeB 421 while active on WIFI network 450. UE 401 connects to LTE network 420 through eNodeB 422. UE 401 is idle on eNodeB 422 but monitoring the paging channel for pages. EPDG 440 translates WIFI network identifiers for WIFI network 450 to eNodeB identifiers and transfers the eNodeB identifiers to MME 430. MME 430 processes the eNodeB identifiers to identify eNodeB 422 as serving UE 401. When MME 430 receives a page for UE 401, MME 430 transfers the page to eNodeB 422 for delivery to UE 401.

Figure 6:
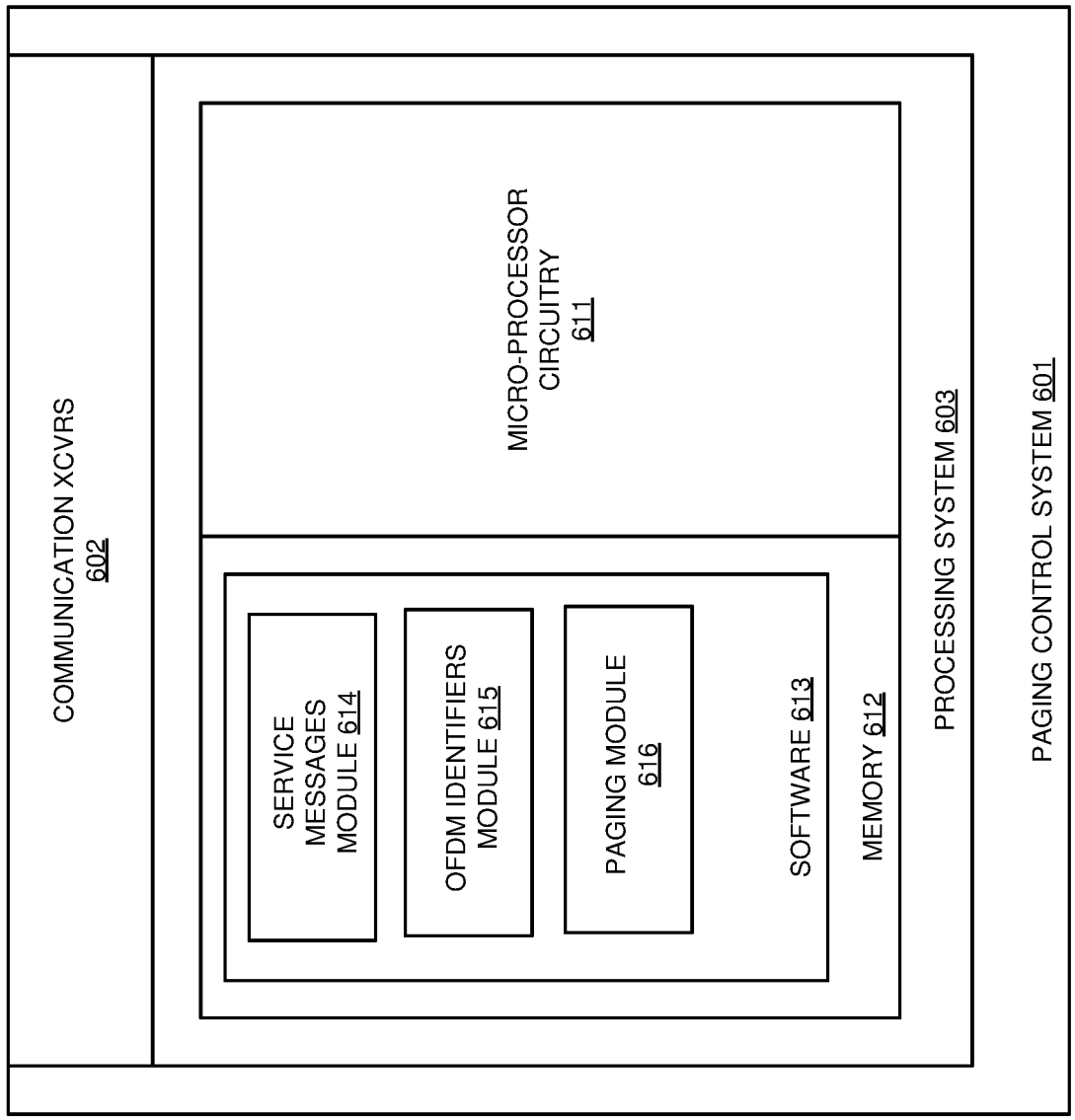
FIG. 6 illustrates an example of a paging control system.

FIG. 6 illustrates paging control system 601. Paging control system 601 is an example of paging control system 131 and MME 430 although paging control system 131 and MME 430 may use alternative configurations. Paging control system 601 comprises communication transceiver system 602 and processing system 603. Processing system 603 is linked to communication transceiver system 602. Processing system 603 includes processing circuitry 611 and memory 612 that stores software 613. Software 613 comprises service messages module 614, OFDM identifiers module 615, and paging module 616.

Communication transceiver system 602 comprises components that communicate over communication links, such as network cards, ports, RF transceivers, processing circuitry and software, or some other communication devices. Communication transceiver system 602 may be configured to communicate over metallic, wireless, or optical links. Communication transceiver 602 may be configured to use TDM, IP, Ethernet, optical networking, wireless protocols, communication signaling, or some other communication format—including combinations thereof.

Processing circuitry 611 comprises microprocessor and other circuitry that retrieves and executes operating software 613 from memory 612. Memory 612 comprises a non-transitory storage medium, such as a disk drive, flash drive, data storage circuitry, or some other memory apparatus. Operating software 613 comprises computer programs, firmware, or some other form of machine-readable processing instructions. Software 613 may include an operating system, utilities, drivers, network interfaces, applications, or some other type of software. When executed by circuitry 611, operating software 613 directs processing system 603 to operate paging control system 601 as described herein.

In particular, operating software 613 directs processing system 603 to deliver pages to wireless communication devices based on a WIFI network identifier. Service messages module 614 directs processing system 603 to process service messages from the OFDM access points to identify the current OFDM access point serving the wireless communication device. OFDM identifier module 615 directs processing system 603 to process the corresponding OFDM access point identifiers to identify the current ODM access point serving the wireless communication device. Paging module 616 directs processing system 603 to deliver the page(s) to the wireless communication device.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

OFDM access points 121-122 comprise RF communication circuitry and an antenna. The RF communication circuitry typically includes an amplifier, filter, RF modulator, and signal processing circuitry. OFDM access points 121-122 may also comprise a router, server, memory device, software, processing circuitry, cabling, power supply, network communication interface, structural support, or some other communication apparatus. OFDM access points 121-122 could be a base station, base station transceiver (BTS), eNodeB, telephony service node, wireless data access point, or some other wireless communication system—including combinations thereof.

OFDM paging system 130 comprises a computer system and communication interface. OFDM paging system 130 may also include other components such as a router, server, data storage system, and power supply. OFDM paging system 130 may reside in a single device or may be distributed across multiple devices. OFDM paging system 130 could be integrated within the components of OFDM access points 121-122. In some examples, OFDM paging system 130 comprises a Mobility Management Entity (MME).

OFDM network 120 comprises network elements that provide communications services to wireless device 101 through OFDM access points 121-122. OFDM network 120 may comprise switches, wireless access nodes, Internet routers, network gateways, application servers, computer systems, communication links, or some other type of communication equipment—including combinations thereof.

Wireless links 111-113 use the air or space as the transport media. Wireless links 111-113 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 114-118 use metal, glass, air, space, or some other material as the transport media. Communication links 114-118 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 114-118 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to page a wireless communication device over Orthogonal Frequency Division Multiplexing (OFDM) access points, the method comprising:
    a WIFI gateway identifying WIFI networks that serve the wireless user device;
    the WIFI gateway determining individual ones of the Orthogonal Frequency Division Multiplexing (OFDM) access points to page the wireless user device based on the individual ones of the WIFI networks that serve the wireless user device;
    the WIFI gateway indicating the OFDM access points to a paging system;
    the paging system receiving service messages from the OFDM access points that are serving the wireless user device when the wireless user device is in active mode;
    the paging system determining the individual ones of the OFDM access points to page the wireless user device based on the service messages; and
    the paging system receiving a page for the wireless user device and responsively transferring the page to a current one of the OFDM access points indicated by at least one of the WIFI gateway or the service messages, wherein the current one of the OFDM access points receives the page and wirelessly transfers the page to the wireless user device.

2. The method of claim 1 wherein the paging system transferring the page to the current one of the OFDM access points comprises transferring the page to the current one of the OFDM access points when the UE is in idle mode.

3. The method of claim 1 wherein the WIFI networks serve the wireless user device with one or more of text messages, voice calls, video calls, multimedia requests, or data request.

4. The method of claim 1 wherein the paging system transferring the page to the current one of the OFDM access points comprises transferring the page to the current one of the OFDM access points indicated by the WIFI gateway when the UE is in idle mode and transferring the page to the current one of the OFDM access points indicated by the service messages when the UE is in active mode.

5. The method of claim 1 wherein the WIFI gateway determining the individual ones of the OFDM access points to page the wireless user device based on the individual ones of the WIFI networks that serve the wireless user device comprises translating Service Set Identifications (SSIDs) for the WIFI networks into OFDM access point identifiers.

6. The method of claim 1 wherein the WIFI gateway determining the individual ones of the OFDM access points to page the wireless user device based on the individual ones of the WIFI networks that serve the wireless user device comprises translating Media Access Control (MAC) addresses for the WIFI networks into OFDM access point identifiers.

7. The method of claim 1 wherein the WIFI gateway determining the individual ones of the OFDM access points to page the wireless user device based on the individual ones of the WIFI networks that serve the wireless user device comprises translating Internet Protocol (IP) addresses for the WIFI networks into OFDM access point identifiers.

8. The method of claim 1 wherein the WIFI gateway determining the individual ones of the OFDM access points to page the wireless user device based on the individual ones of the WIFI networks that serve the wireless user device comprises translating Uniform Resource Identifiers (URIs) for the WIFI networks into OFDM access point identifiers.

9. The method of claim 1 wherein the paging system comprises a Mobility Management Entity (MME).

10. The method of claim 1 wherein the WIFI gateway comprises an evolved Packet Data Gateway (ePDG).

11. A wireless communication network to page a wireless communication device over Orthogonal Frequency Division Multiplexing (OFDM) access points, the wireless communication network comprising:
    a WIFI gateway configured to identify WIFI networks that serve the wireless user device, determine individual ones of the Orthogonal Frequency Division Multiplexing (OFDM) access points to page the wireless user device based on the individual ones of the WIFI networks that serve the wireless user device, and indicate the OFDM access points to a paging system;
    the paging system configured to receive service messages from the OFDM access points that are serving the wireless user device when the wireless user device is in active mode;
    the paging system configured to determine the individual ones of the OFDM access points to page the wireless user device based on the service messages; and
    the paging system configured to receive a page for the wireless user device and responsively transfer the page to a current one of the OFDM access points indicated by at least one of the WIFI gateway or the service messages, wherein the current one of the OFDM access points is configured to receive the page and wirelessly transfer the page to the wireless user device.

12. The wireless communication network of claim 11 wherein the paging system is configured to transfer the page to the current one of the OFDM access points when the UE is in idle mode.

13. The wireless communication network of claim 11 wherein the WIFI networks serve the wireless user device with one or more of text messages, voice calls, video calls, multimedia requests, or data request.

14. The wireless communication network of claim 11 wherein the paging system is configured to transfer the page to the current one of the OFDM access points indicated by the WIFI gateway when the UE is in idle mode and transfer the page to the current one of the OFDM access points indicated by the service messages when the UE is in active mode.

15. The wireless communication network of claim 11 wherein the WIFI gateway is configured to translate Service Set Identifications (SSIDs) for the WIFI networks into OFDM access point identifiers to determine the individual ones of the OFDM access points to page the wireless user device based on the individual ones of the WIFI networks that serve the wireless user device.

16. The wireless communication network of claim 11 wherein the WIFI gateway is configured to translate Media Access Control (MAC) addresses for the WIFI networks into OFDM access point identifiers to determine the individual ones of the OFDM access points to page the wireless user device based on the individual ones of the WIFI networks that serve the wireless user device.

17. The wireless communication network of claim 11 wherein the WIFI gateway is configured to translate Internet Protocol (IP) addresses for the WIFI networks into OFDM access point identifiers to determine the individual ones of the OFDM access points to page the wireless user device based on the individual ones of the WIFI networks that serve the wireless user device.

18. The wireless communication network of claim 11 wherein the WIFI gateway is configured to translate Uniform Resource Identifiers (URIs) for the WIFI networks into OFDM access point identifiers to determine the individual ones of the OFDM access points to page the wireless user device based on the individual ones of the WIFI networks that serve the wireless user device.

19. The wireless communication network of claim 11 wherein the paging system comprises a Mobility Management Entity (MME).

20. The wireless communication network of claim 11 wherein the WIFI gateway comprises an evolved Packet Data Gateway (ePDG).

* * * * *